US011093150B2

(12) United States Patent
Satomi

(10) Patent No.: US 11,093,150 B2
(45) Date of Patent: Aug. 17, 2021

(54) IMAGE PROCESSING APPARATUS

(71) Applicant: KYOCERA Document Solutions Inc., Osaka (JP)

(72) Inventor: Seiki Satomi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/898,715

(22) Filed: Jun. 11, 2020

(65) Prior Publication Data

US 2020/0401310 A1 Dec. 24, 2020

(30) Foreign Application Priority Data

Jun. 21, 2019 (JP) .............................. JP2019-115917

(51) Int. Cl.
*H04N 1/04* (2006.01)
*G06F 3/06* (2006.01)
*H04N 1/00* (2006.01)
*H04N 1/21* (2006.01)

(52) U.S. Cl.
CPC ............ *G06F 3/064* (2013.01); *G06F 3/0604* (2013.01); *G06F 3/0673* (2013.01); *H04N 1/00801* (2013.01); *H04N 1/2108* (2013.01)

(58) Field of Classification Search
CPC ...... G06F 3/064; G06F 3/0638; G06F 3/0604; G06F 3/0673; H04N 1/00801; H04N 1/2108
See application file for complete search history.

(56) References Cited

U.S. PATENT DOCUMENTS

2002/0040415 A1* 4/2002 Moteki .................. G06F 13/28
710/260

FOREIGN PATENT DOCUMENTS

JP        H9-018698        1/1997

* cited by examiner

*Primary Examiner* — Moustapha Diaby
(74) *Attorney, Agent, or Firm* — Lex IP Meister, PLLC

(57) ABSTRACT

An image processing apparatus includes a block output unit, an arithmetic processing circuit, a data reading circuit, and a block descriptor generation unit. The block output unit outputs a block image based on an input block descriptor. The data reading circuit reads the block image after image processing from the arithmetic processing circuit based on an output block descriptor and outputs the block image after the image processing. The arithmetic processing circuit executes the image processing on block images for one band in accordance with an input band request. The data reading circuit outputs block images for one band in accordance with an output band request. The block descriptor generation unit stores input block descriptors and output block descriptors for at least one band in the predetermined memory in line with timing of the input band request or the output band request.

5 Claims, 7 Drawing Sheets

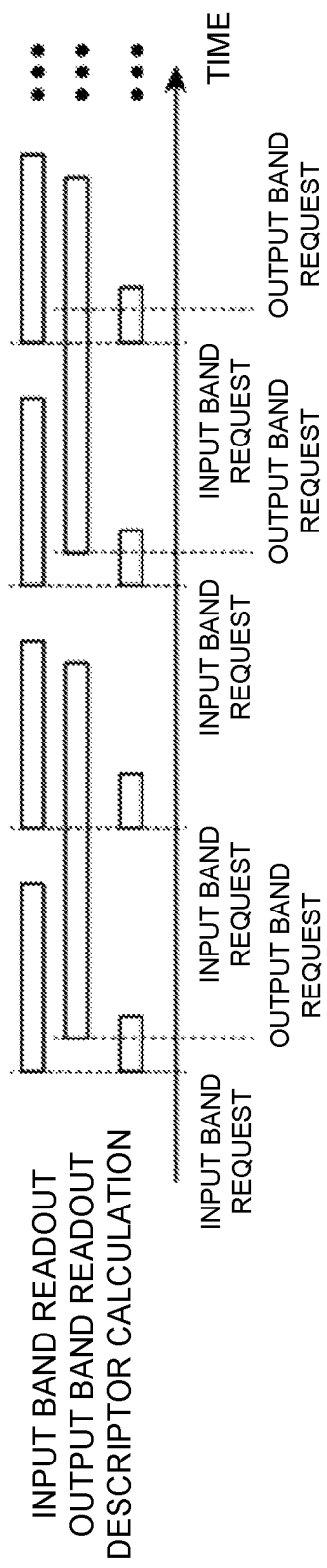

IMAGE PROCESSING APPARATUS

INCORPORATION BY REFERENCE

This application is based upon and claims the benefit of priority from the corresponding Japanese Patent Application No. 2019-115917 filed on Jun. 21, 2019, the entire contents of which are incorporated herein by reference.

BACKGROUND

The present disclosure relates to an image processing apparatus.

An image processing apparatus divides a stripe image with a predetermined number of lines into block images, performs pixel density conversion on the block images, and generates, by the block division address control unit, timing and address signals of block division processing from the stripe images to the block images.

SUMMARY

An image processing apparatus according to the present disclosure includes a block output unit, an arithmetic processing circuit, a data reading circuit, and a block descriptor generation unit. The block output unit reads an input block descriptor indicating a position and a size of a block image from a predetermined memory, and extracts and outputs the block image as part of a page image based on the input block descriptor. The arithmetic processing circuit executes predetermined image processing on the block image. The data reading circuit reads an output block descriptor indicating the position and the size of the block image from the predetermined memory, reads the block image after the predetermined image processing from the arithmetic processing circuit based on the output block descriptor, and outputs the block image after the predetermined image processing. The block descriptor generation unit generates the input block descriptor and the output block descriptor and stores the input block descriptor generated and the output block descriptor generated in the predetermined memory. The arithmetic processing circuit executes the predetermined image processing on block images for one band in accordance with an input band request. The data reading circuit outputs the block images for one band in accordance with an output band request. The block descriptor generation unit stores input block descriptors and output block descriptors for at least one band in the predetermined memory in line with timing of the input band request or the output band request.

BRIEF DESCRIPTION OF THE DRAWINGS

FIG. 2A, FIG. 2B, and FIG. 2C are timing charts for explaining an operation of an image processing apparatus according to a first embodiment.

DETAILED DESCRIPTION

Hereinafter, embodiments of the present disclosure will be described with reference to the drawings.

Embodiment 1

Figure 1:
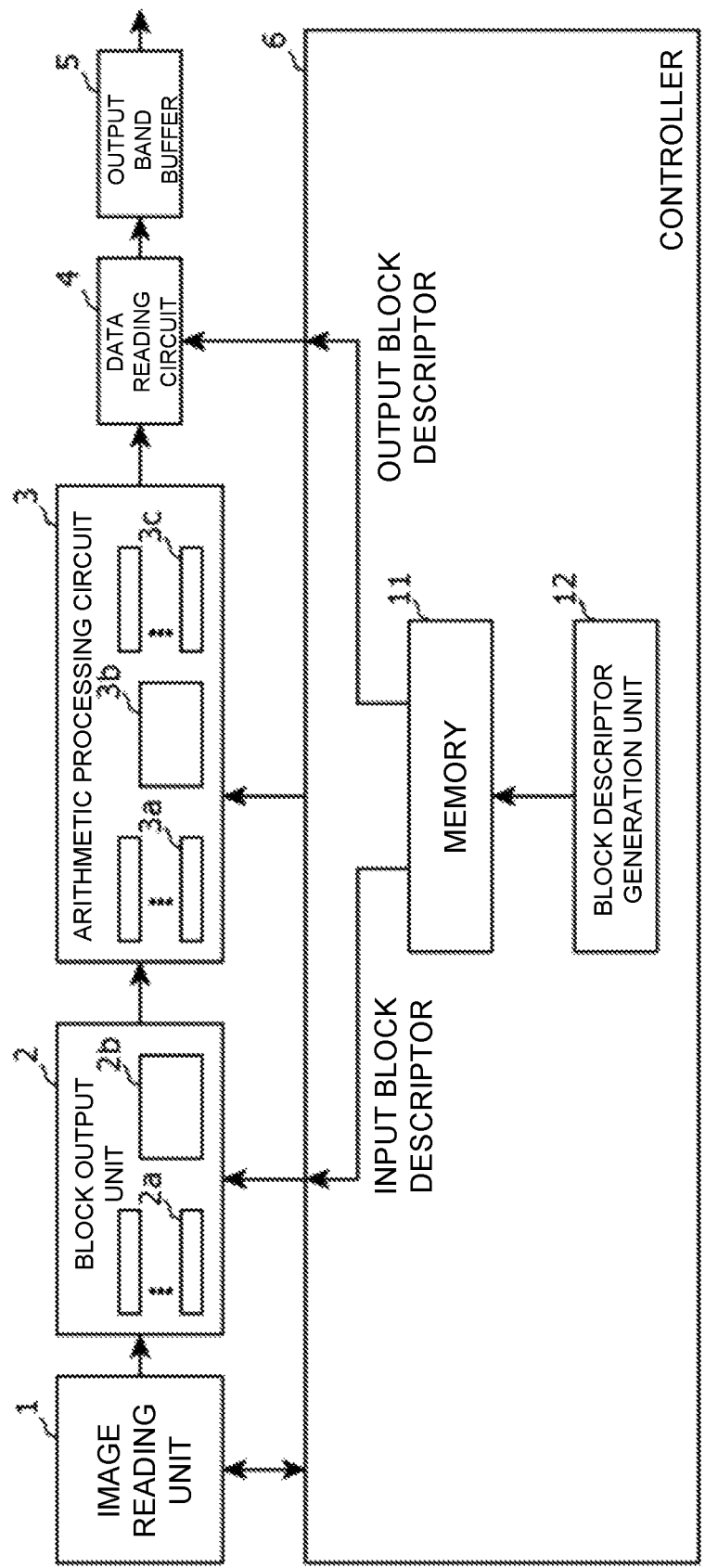
FIG. 1 is a block diagram illustrating a configuration of an image processing apparatus according to an embodiment of the present disclosure.

FIG. 1 is a block diagram illustrating a configuration of an image processing apparatus according to an embodiment of the present disclosure. The image processing apparatus illustrated in FIG. 1 is, for example, a scanner, a copier, a facsimile machine, a multifunction peripheral, or the like, optically reads a document image from a document, and rotates the document image by a hardware process.

The image processing apparatus illustrated in FIG. 1 includes an image reading unit 1, a block output unit 2, an arithmetic processing circuit 3, a data reading circuit 4, an output band buffer 5, and a controller 6.

The image reading unit 1 includes a platen glass, an automatic document feeder, an image reading optical system, an image sensor, an image data generation circuit, and the like, causes an image reading optical system to capture a document image of a document placed on a platen glass or a document conveyed by an automatic document feeder, and outputs image data of a document image (input image) read by the image sensor using an image data generation circuit. Here, the image sensor is a line sensor, and the image reading unit 1 outputs image data of the input image by one pixel line.

The block output unit 2 receives image data output from the image reading unit 1 by one pixel line of the input page image, stores the received image data in the input band buffer 2a, sequentially reads the input block image from the input band buffer 2a by the read circuit 2b, and outputs the read image data. More specifically, the input band buffer 2a stores one or a plurality of input bands (a predetermined number of pixel lines) obtained by dividing an input image (here, a page image). Further, the read circuit 2b reads an input block image from the input band stored in the input band buffer 2a, and outputs the read input block image to the input line buffer 3a having the predetermined number of pixel lines in order of one pixel line of the input block image.

The block output unit 2 reads the input block descriptor from the predetermined memory (the memory 11 described later), and extracts and outputs a block image (input block image) having a predetermined size that is a part of the page image based on the input block descriptor. The input block descriptor is data indicating a position (address in the memory) and a size of the input block image. The block image is a partial image in which the width and the height have a predetermined number of pixels.

The input block images that are adjacent to each other may overlap each other by a predetermined number of pixels or may not overlap each other.

The arithmetic processing circuit 3 sequentially reads the pixel lines of the input block image from the input line buffer 3a, performs predetermined image processing (scaling, rotation, etc.) on the input block images by the arithmetic unit 3b, and sequentially stores the pixel lines of the output block images in the output line buffer 3c.

The data reading circuit 4 reads the output block descriptor from the predetermined memory (the memory 11 described later), reads the block image (the output block image) after the image processing from the output line buffer 3c based on the output block descriptor, and stores the read block image in the output band buffer 5. The output block descriptor is data indicating a position (address in the memory) and a size of the output block image.

The processing circuitry in the subsequent stage (not shown) sequentially reads the image data from the output band buffer 5 and executes a predetermined image processing or the like.

Here, the input band buffer 2a and the output band buffer 5 are memory areas reserved in the dynamic RAM (not shown), and the input line buffer 3a and the output line buffer 3c are memory areas reserved in the static RAM (not shown).

One input band is composed of input block images of a number V1 in the vertical direction and a number H1 in the horizontal direction (V1>0, H1>0), and one output band is composed of output block images of a number V2 in the vertical direction and a number H2 in the horizontal direction (V2>0, H2>0).

The block output unit 2, the arithmetic processing circuit 3, and the data reading circuit 4 operate in parallel, and perform pipeline processing.

The controller 6 controls the image reading unit 1, the block output unit 2, the arithmetic processing circuit 3, the data reading circuit 4, and the like. The controller 6 includes a memory 11 such as a RAM and a processor that operates in accordance with the program, and operates as the block descriptor generation unit 12 by executing the program by the processor. The block descriptor generation unit 12 generates an input block descriptor and an output block descriptor, and stores the generated input block descriptor and output block descriptor in a predetermined memory 11. In this way, the block output unit 2, the arithmetic processing circuit 3, and the data reading circuit 4 are independent hardware circuits, and the controller 6 is a software processing unit that controls the hardware circuits.

The arithmetic processing circuit 3 executes the image processing of the input block images for one band in the input band buffer 2a in accordance with the input band request, and the data reading circuit 4 outputs the output block images for one band to the output band buffer 5 in accordance with the output band request. Then, the block descriptor generation unit 12 stores the input block descriptors and the output block descriptors for at least one band in the predetermined memory 11 in accordance with the timing of the input band request or the output band request.

Note that the input band request and the output band request are generated by the block output unit 2, the input band request is included in the corresponding input block descriptor (the input block descriptor for the leading input block image of the band) and transmitted to the arithmetic processing circuit 3, and the output band request is included in the corresponding output block descriptor (the output block descriptor for the leading output block image of the band) and transmitted to the data reading circuit 4.

In the first embodiment, the block descriptor generation unit 12 (a) generates input block descriptors and output block descriptors for at least one band in accordance with the timing of the input band request and stores the generated input block descriptors and output block descriptors in the predetermined memory 11 when the number of block images per band of the input of the arithmetic processing circuit 3 is smaller than the number of block images per band of the output of the arithmetic processing circuit 3 and (b) generates input block descriptors and output block descriptors for at least one band in accordance with the timing of the output band request and stores the generated input block descriptors and output block descriptors in the predetermined memory 11 when the number of block images per band of the output of the arithmetic processing circuit 3 is smaller than the number of block images per band of the input of the arithmetic processing circuit 3.

In the first embodiment, the block descriptor generation unit 12 repeats generation of the input block descriptor and the output block descriptor to each time generate input block descriptors and output block descriptors for a predetermined fixed number of bands and store the generated input block descriptors and output block descriptors in the memory area.

The controller 6 also specifies a value of the parameter, such as the size of the input block image, in the arithmetic processing circuit 3.

Figure 2A:
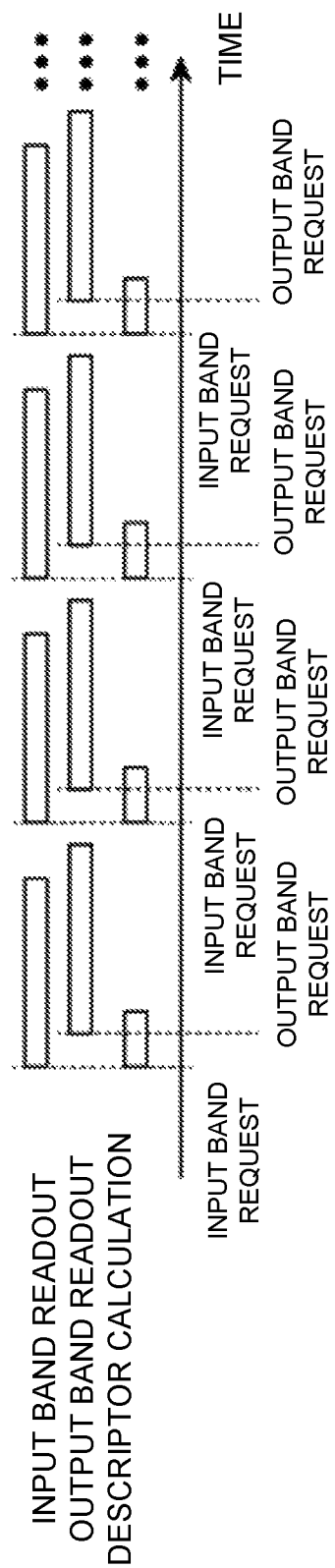
Figure 2C:
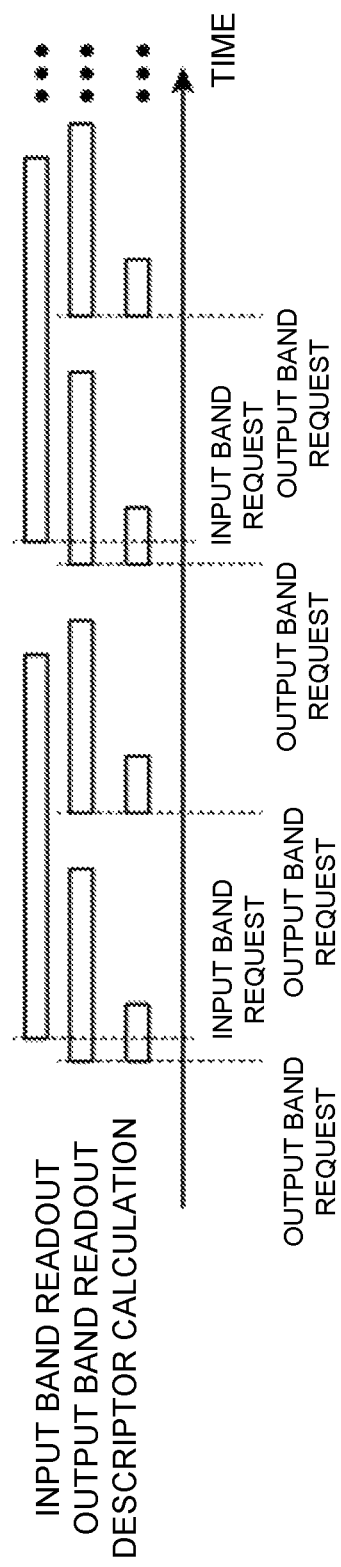

Next, an operation of the image processing apparatus according to the first embodiment will be described. FIGS. 2A through 2C are timing charts for explaining an operation of the image processing apparatus according to the first embodiment. FIG. 2A is a timing chart in a case where the output block image is equal in size to the input block image. FIG. 2B is a timing chart in a case where an output block image is reduced for an input block image. FIG. 2C is a timing chart in a case where an output block image is enlarged for an input block image.

For the equal-scale, the input block descriptors for one band and the output block descriptors for one band are collectively generated in accordance with the input band request and stored in the memory 11. In this case, unnecessary input block descriptor and output block descriptor are overwritten by the newly generated input block descriptor and output block descriptor.

In the case of the reduction, since the number of block images in the input band is smaller than the number of block images in the output band, the input block descriptors for one band and the output block descriptors for one band are collectively generated in accordance with the input band request and stored in the memory 11. In this case, unnecessary input block descriptor and output block descriptor are overwritten by the newly generated input block descriptor and output block descriptor.

For example, if the size of the input block image is 128×128 pixels, the reduction ratio is 1/8, the size of the output block image is 16×16 pixels, the size of the page image before reduction is 7040×4096 pixels (A4 with 600 dpi), and the size of the page image after reduction is 880×512 pixels, then the number of block images in the input band is 55 (=55×1) and the number of block images in the output band is 440 (=55×8). Therefore, in the case of the reduction, the number of block images in the input band is smaller than the number of block images in the output band.

In the case of enlargement, since the number of block images in the output band is smaller than the number of block images in the input band, the input block descriptors for one band and the output block descriptors for one band are collectively generated in accordance with the output band request and stored in the memory 11. In this case, unnecessary input block descriptor and output block descriptor are overwritten by the newly generated input block descriptor and output block descriptor.

For example, if the size of the input block image is 16×16 pixels, the enlargement ratio is 8, the size of the output block image is 128×128 pixels, the size of the page image before enlargement is 880×512 pixels, and the size of the page image after enlargement is 7040×4096 pixels (A4 with 600 dpi), then the number of block images in the input band is 440 (=55×8) and the number of blocks in the output band is 55 (=55×1). Therefore, in the case of enlargement, the number of block images in the output band is smaller than the number of block images in the input band.

By doing so, in the memory 11, the size of the memory area in which the input block descriptor and the output block descriptor are stored may be small. For example, the block descriptor is generated and stored in accordance with one of the input band request and the output band request according to the scaling factor (reduction ratio or enlargement ratio) set by the user or the like. This makes it possible to minimize the size of the memory area described above.

The block descriptor generation unit 12 may repeat generation of the input block descriptor and the output block descriptor to each time generate input block descriptors and output block descriptors for a plurality of bands and store the generated input block descriptors and output block descriptors in the memory area.

As described above, according to the first embodiment described above, the block output unit 2 extracts and outputs a block image that is a part of the page image based on the input block descriptor. The arithmetic processing circuit 3 executes a predetermined image processing on the block image. The data reading circuit 4 reads the block image after the image processing from the arithmetic processing circuit 3 based on the output block descriptor and outputs the block image after the image processing. The arithmetic processing circuit 3 executes image processing on the block images for one band in the input band buffer 2a in accordance with the input band request, and the data reading circuit 4 outputs the block images for one band to the output band buffer 5 in accordance with the output band request. Then, the block descriptor generation unit 12 stores the input block descriptors and the output block descriptors for at least one band in the predetermined memory 11 in accordance with the timing of the input band request or the output band request.

As a result, the block descriptor is repeatedly generated and stored for each predetermined number of bands, without generating and storing the block descriptor of the entire page image in advance, and therefore the memory area for the block descriptor used in the block division processing in the block output unit 2 may have a relatively small size.

Embodiment 2

In Embodiment 2, the block descriptor generation unit 12 repeats generation of the input block descriptor and the output block descriptor to each time generate input block descriptors and output block descriptors in a number allowed for the writing in an memory area of a predetermined size (fixed size) in the memory 11 and store the generated input block descriptors and output block descriptors in the memory area.

In Embodiment 2, the block descriptor generation unit 12 repeats generation of the input block descriptor and the output block descriptor to each time generate input block descriptors and output block descriptors for a plurality of bands and store the generated input block descriptors and output block descriptors in the memory area.

Figure 3A:
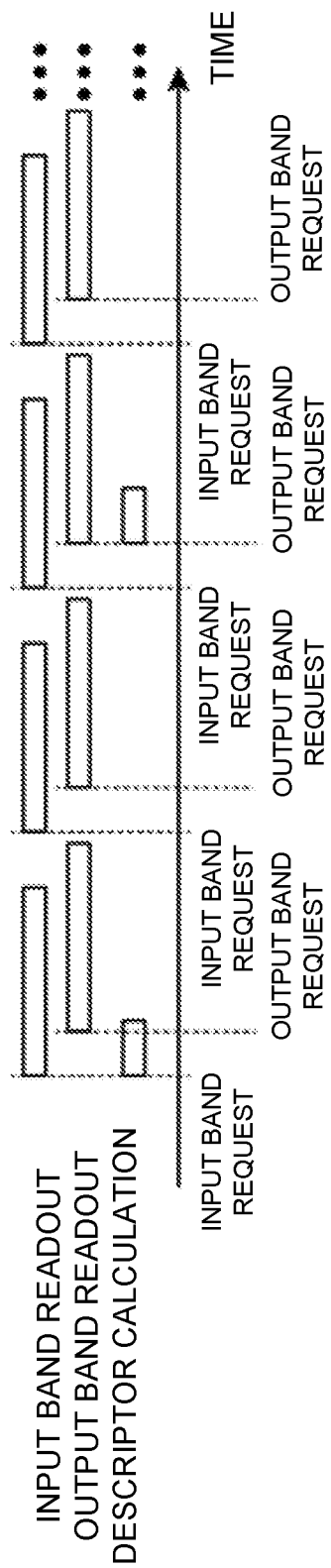
FIG. 3A, FIG. 3B, and FIG. 3C are timing charts for explaining an operation of an image processing apparatus according to a second embodiment.
Figure 3B:
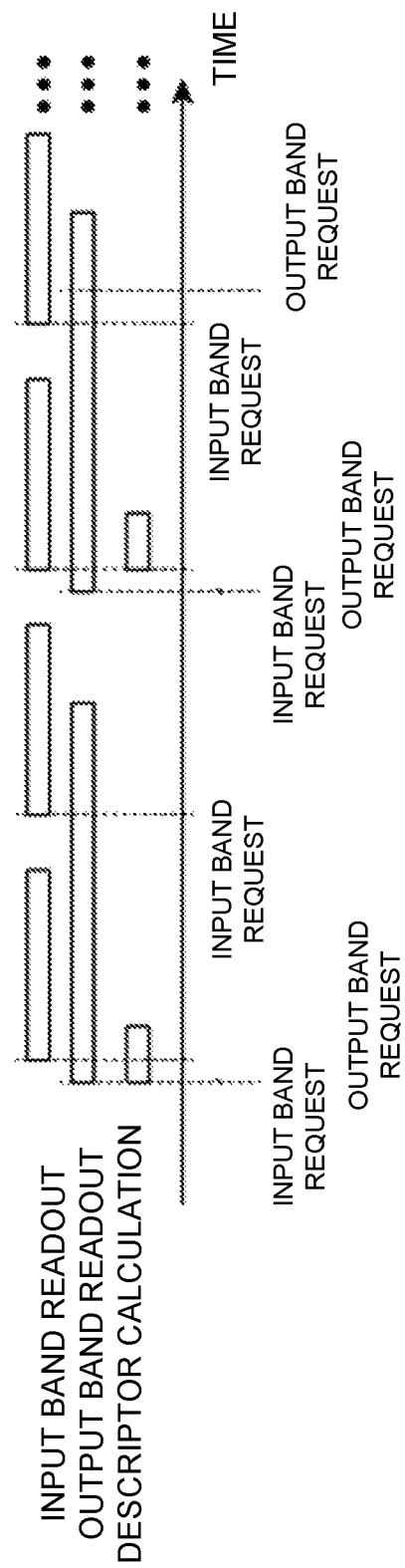
Figure 3C:
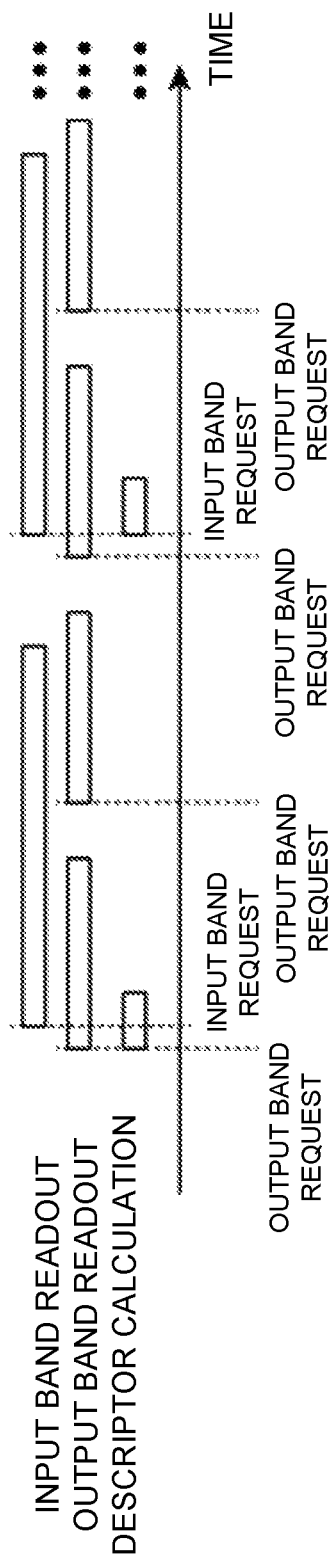

FIGS. 3A through 3C are timing charts for explaining an operation of the image processing apparatus according to the second embodiment. FIG. 3A is a timing chart in a case where the output block image is equal in size to the input block image. FIG. 3B is a timing chart in a case where an output block image is reduced for an input block image. FIG. 3C is a timing chart in a case where an output block image is enlarged for an input block image.

The block descriptor generation unit 12 counts the input band request and output band request, generates an input block descriptor and an output block descriptor when an input block descriptor and an output block descriptor for a predetermined number of bands (for example, a total of 5 bands for an input band and an output band) are unnecessary in the above-described memory area, and overwrites the unnecessary input block descriptor and the output block descriptor with the newly generated input block descriptor and output block descriptor.

Further, the block descriptor generation unit 12 checks the free space in the memory area immediately before generating the newly generated input block descriptor or output block descriptor. When the free space is sufficient and the newly generated input block descriptor or output block descriptor can be written, the block descriptor generation unit 12 generates an input block descriptor or an output block descriptor and stores the generated input block descriptor or output block descriptor in the above-described memory area. When the free space is not sufficient and the newly generated input block descriptor or output block descriptor cannot be written, the block descriptor generation unit 12 interrupts the generation of the input block descriptor or the output block descriptor.

The other configurations and operations of the image processing apparatus according to the second embodiment are the same as those of the first embodiment, and therefore, description thereof will be omitted.

As described above, according to the second embodiment, since the block descriptor is collectively generated for each of the plurality of bands, the number of startups (the number of calls) of the block descriptor generation unit 12 as the software processing unit is reduced, and the overhead time at the time of activation may be short.

It will be apparent to those skilled in the art that various changes and modifications to the above-described embodiments may be made. Such changes and modifications may be made without departing from the spirit and scope of the subject matter and without diminishing the intended advantages. That is, it is intended that such modifications and alterations be included within the scope of the claims.

For example, in the above-described embodiment, the block descriptor generation unit 12 may generate an input block descriptor and an output block descriptor by the timing of the input band request or the output band request after the image processing of the arithmetic processing circuit 3 is completed, or may generate the input block descriptor and the output block descriptor in parallel with the image processing of the arithmetic processing circuit 3.

What is claimed is:
1. An image processing apparatus comprising:
a block output unit that reads an input block descriptor indicating a position and a size of a block image from a predetermined memory, and extracts and outputs the block image as part of a page image based on the input block descriptor;
an arithmetic processing circuit that executes predetermined image processing on the block image;
a data reading circuit that reads an output block descriptor indicating the position and the size of the block image from the predetermined memory, reads the block image after the predetermined image processing from the arithmetic processing circuit based on the output block descriptor, and outputs the block image after the predetermined image processing; and
a block descriptor generation unit that generates the input block descriptor and the output block descriptor and stores the input block descriptor generated and the output block descriptor generated in the predetermined memory,
wherein the arithmetic processing circuit executes the predetermined image processing on block images for one band in accordance with an input band request,
wherein the data reading circuit outputs the block images for one band in accordance with an output band request, and wherein the block descriptor generation unit stores input block descriptors and output block descriptors for at least one band in the predetermined memory in line with timing of the input band request or the output band request.

2. The image processing apparatus according to claim 1, wherein the block descriptor generating unit:
   (a) generates and stores, in the predetermined memory, the input block descriptors and the output block descriptors for at least one band in line with the timing of the input band request when a number of block images per band of an input to the arithmetic processing circuit is smaller than the number of block images per band of an output from the arithmetic processing circuit; and
   (b) generates and stores, in the predetermined memory, the input block descriptors and the output block descriptors for at least one band in line with the timing of the output band request when the number of block images per band of the output from the arithmetic processing circuit is smaller than the number of block images per band of the input to the arithmetic processing circuit.

3. The image processing apparatus according to claim 1, wherein the block descriptor generation unit:
   (a) stores the input block descriptor and the output block descriptor in a memory area having a predetermined size in the predetermined memory; and
   (b) repeats generation of the input block descriptor and the output block descriptor to each time generate and store, in the memory area, input block descriptors and output block descriptors for a predetermined fixed number of bands or input block descriptors and output block descriptors in a number allowed for writing in the memory area.

4. The image processing apparatus according to claim 3, wherein the block descriptor generation unit repeats generation of the input block descriptor and the output block descriptor to each time generate and store, in the memory area, input block descriptors and output block descriptors for a plurality of bands.

5. The image processing apparatus according to claim 1, wherein the block descriptor generation unit generates the input block descriptor and the output block descriptor in parallel with the predetermined image processing in the arithmetic processing circuit.

\* \* \* \* \*